United States Patent [19]
Park

[11] Patent Number: 5,307,977
[45] Date of Patent: May 3, 1994

[54] MULTI HEATER BLOCK OF WIRE BONDER

[75] Inventor: Sang B. Park, Choongchungbook-Do, Rep. of Korea

[73] Assignee: Goldstar Electron Co., Ltd., Choongchungbook-Do, Rep. of Korea

[21] Appl. No.: 994,830

[22] Filed: Dec. 23, 1992

[30] Foreign Application Priority Data

Dec. 23, 1991 [KR] Rep. of Korea ............... 23607/1991

[51] Int. Cl.$^5$ .................................................. B23K 37/04
[52] U.S. Cl. ................................. 228/4.5; 228/49.5; 269/903
[58] Field of Search ............... 228/4.5, 44.7, 47, 49.1, 228/179; 269/903; 219/56.21, 56.22

[56] References Cited

U.S. PATENT DOCUMENTS 3,738,560 6/1973 Kulicke, Jr. et al. ............... 228/6.2
3,894,671 7/1975 Kuliche, Jr. et al. ............... 228/4.5

Primary Examiner—Samuel M. Heinrich
Attorney, Agent, or Firm—Lowe, Price, LeBlanc & Becker

[57] ABSTRACT

A multi heater block of a wire bonder including a multi heater block of such a wire bonder in which one heater may be used in various kinds of packages having different paddle size. The multi heater block of a wire bonder includes a paddle support formed on the upper surface of a heater block body at a relatively lower height than that of the upper surface thereof; a guide groove formed so as to have a predetermined depth and width between the paddle support and a periphery wall of the heater block body; a plurality of lead support portion disposed in the four cornor of the paddle support portion so as to form a paddle seating portion therein, a support portion inserted into the guide groove and a thin plate portion folded at the upper surface of the paddle support portion being integrally formed with each other; and a plurality of size adjusting units clamped between the support portion of the lead support portion and the periphery wall of the heater block body so as to be moved in every direction and fixed the lead support portion.

9 Claims, 4 Drawing Sheets

MULTI HEATER BLOCK OF WIRE BONDER

BACKGROUND OF THE INVENTION

1. Field of the Invention

The present invention relates to a heater block for preheating a lead frame in a wire bonder for electrically connecting a semiconductor to the lead frame by bonding opposite ends of a plurality of wires, such as gold wires, and more particularly to a multi heater block of such a wire bonder in which one heater block preheats various kinds of lead frames having different paddle size so that the exchange time and the manufacturing expense of the heater block due to the change of kind of the lead frame are reduced.

2. Description of the Prior Art

Conventionally, wire bonding is performed after preheating a lead frame at a predetermined temperature as a bonding pad of a semiconductor chip is electrically connected to an inner lead of a lead frame by bonding opposite ends of a plurality of wires, such as gold wires, respectively. Accordingly, the wire bonder is generally provided with a heater block for preheating the lead frame transferred thereto.

With reference to FIG. 1A which shows a known heater block body including a paddle seating part 2 protruded thereon at a predetermined heighth, for example 0.5 mm, of which a paddle seating groove 2a is provided inside the paddle seating part 2 for allowing the size of the paddle seating groove 2a to be corresponded to the paddle size of the specific lead frame and paddle support seating grooves 2b and 2c are provided on the front and rear portions of the paddle seating groove 2a so as to be seated a paddle support for allowing the paddle of the lead frame to be connected and supported.

On the other hand, as shown in FIG. 1B, the paddle seating part 2 is not protruded, and the paddle seating groove 2a and the paddle support seating grooves 2b and 2c are formed in the upper surface of the heater block body 1.

As the size of the paddle seating groove 2a shown in FIGS. 1A and 1B is corresponded to the paddle size of the specific lead frame and a heater (not shown) is disposed inside the heater block body 1, the lead frame can be preheated.

The operation for preheating the lead frame by using the heater block according to the prior art as constructed above is as follows:

First, the heater block fit in the paddle seating groove 2a according to the paddle size of the lead frame to be preheated is mounted on the upper surface of the wire bonder body (not shown) and the height for bonding a wire is adjusted by that of the heater block mount.

When a wire bonding is performed after mounting the heater block in the wire bonder as described above, the lead frame to be preheated is transferred to the upper surface of the heater block by means of a lead frame transferring system (not shown) so that the paddle of the lead frame transferred is seated in the paddle seating groove 2a of the heater block. In result, the lead frame is preheated to the proper temperature for performing a wire bonding by means of heater disposed in the heater block body 1.

Namely, the lead frame is transferred on the upper portion of the heater block and then the paddle thereof is seated into the paddle seating groove 2a so that the lead frame may be preheated by heater (not shown) disposed in the heater block body 1 of the lower portion of the paddle seating part 2 for a prescribed time.

Then, when the preheating of the lead frame is completed at the heater block, a bonding pad of the semiconductor chip and an inner lead is bonded through a plurality of gold wires by the wire bonder and then transferred by the transferring system of the lead frame.

On the other hand, when the paddle size of the lead frame is changed, the heater block having the paddle seating groove 2a fit in the changed paddle size is mounted in the wire bonder after disjointing the heater block mounted in the wire bonder so that the wire bonding is performed by preheating the lead frame as described above.

However, the known heater block should be manufactured by different paddle sizes with corresponding paddle seating grooves 2a, thus causing the cost to be increased. Also, since the heater block should be changed every time the size of the paddle varies, much down time occurs.

In other words, the height of the heater block mount should be adjusted every time the heater block is changed due to the change of the working package. Further, after completing the adjustment, the working should be performed only next to the evalution. Therefore, the known heater block has disadvantage in that it badly affect in the productivity due to the relatively longer down time according to the exchange and the adjustment of the equipment.

SUMMARY OF THE INVENTION

It is, therefore, an object of the present invention to provide a multi heater block of a wire bonder in which the above disadvantages of the known heater block can be overcome and the size of a paddle seating is adjusted so that lead frames of various kinds having a different paddle size can be preheated by one heater block whereby the down time according to the exchange of the heater block and the expence according to the manufacture of several heater blocks having a different size of the paddle seating groove are reduced, thereby improving the quality and the productivity of the package.

The above-mentioned object of the present invention can be accomplished by providing a multi heater block of a wire bonder comprising a paddle support formed on the upper surface of a heater block body at a relatively lower height than that of the upper surface thereof; a guide groove formed so as to have a predetermined depth and width between the paddle support and a periphery wall of the heater block body; a plurality of lead support portions disposed at four corners of the paddle support portion so as to form a paddle seating portion therein, a support portion inserted into the guide groove and a thin plate portion folded at the upper surface of the paddle support portion being integrally formed with each other; and a plurality of size adjusting units clamped between the support portion of the lead support portion and the periphery wall of the heater block body so as to move and fix the lead support portion in front/rear and left/right directions.

Here, the size adjusting unit includes a long hole portion formed in a predetermined part of the periphery wall, having a large diameter portion and a small diameter portion, a screw groove formed in the support portion of the lead support portion, an adjusting screw coupled to the screw groove with the end thereof to be movable in every direction in the long hole portion by hooking the head portion thereof in the small diameter portion of long hole portion, and a support member for supporting the lead support portion against the periphery wall by being outwardly inserted in the adjusting screw.

As for the support member, a compress spring or snap rings may be used.

Also, paddle support seating grooves are formed in the periphery wall in the center of a front and rear portion thereof.

The lead support portion includes two lead support portions forward and backward movably disposed by one size adjusting unit, two lead support portions movably disposed in every direction by two size adjusting units, respectively, disposed in the sideward and forward or backward.

In this case, the size adjusting units for fixing two lead support portions by forwardly and backwardly moving may be replaced with a screw inserting hole having a large diameter portion and a small diameter portion.

Further, one of four separated lead support portions may be fixed, the other thereof may be moved forwardly and backwardly, and the remaining two may be moved in every direction.

Moreover, four lead support portions may be divided by two so as to be eight lead support portions.

According to the present invention as described above, the user disjoints the adjusting screw of the size adjusting unit according to the paddle size, and adjusts the paddle size to the desired size by moving the lead support portion so that the position of the lead support is fixed by fastening the adjusting screw in place.

At this time, as each support portion of the lead support portion is movably disposed forwardly or backwardly in the guide groove, and the lead support portions being movable in every direction is formed in the long hole portion of the size adjusting unit, the position of the adjusting screw can be changed in every direction in the long hole portion.

Therefore, in case of preheating a lead frame having a different paddle size, the size of the paddle seating portion is adjusted by changing in every direction the position of the lead support portion to correspond to the paddle size of the lead frame so that it is not necessary to exchange the heater block on the whole.

BRIEF DESCRIPTION OF THE DRAWINGS

Other objects and aspects of the invention will become apparent from the following description of embodiments with reference to the accompanying drawings, in which.

DETAILED DESCRIPTION OF THE PREFERRED EMBODIMENTS

Figure 1A:
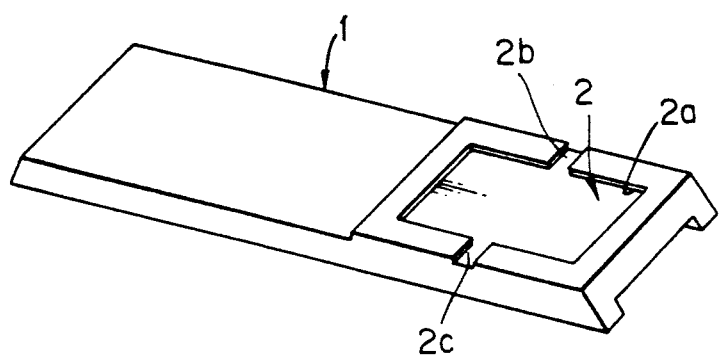
FIG. 1A is a perspective view showing a conventional heater block in which a paddle seating part is proctruded.
Figure 1B:
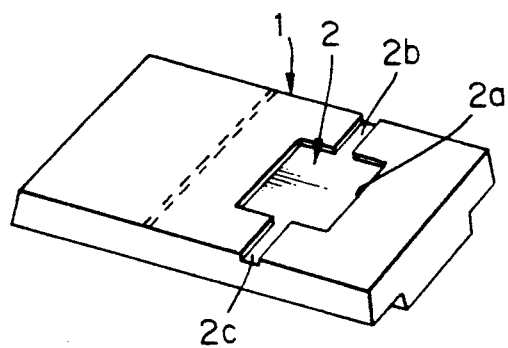
FIG. 1B is a perspective view showing a conventional heater block in which a paddle seating part is groove-shaped.
Figure 2:
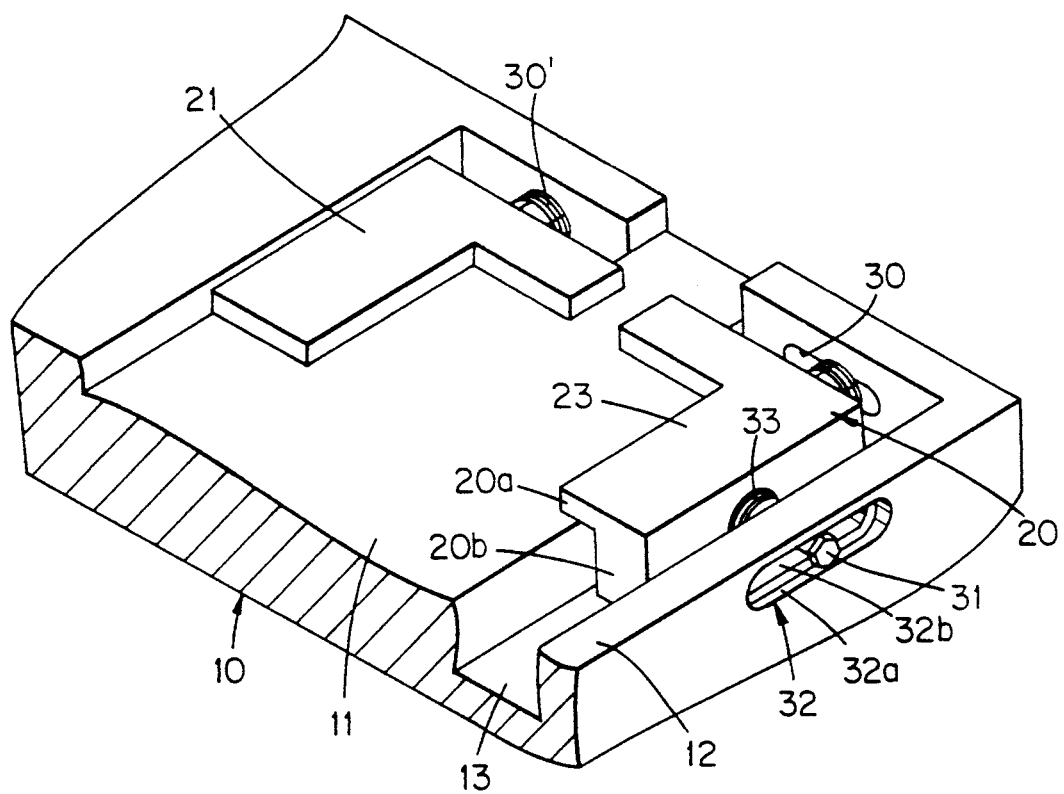
FIG. 2 is a perspective view showing in partial a multi heater block according to this invention.
Figure 3:
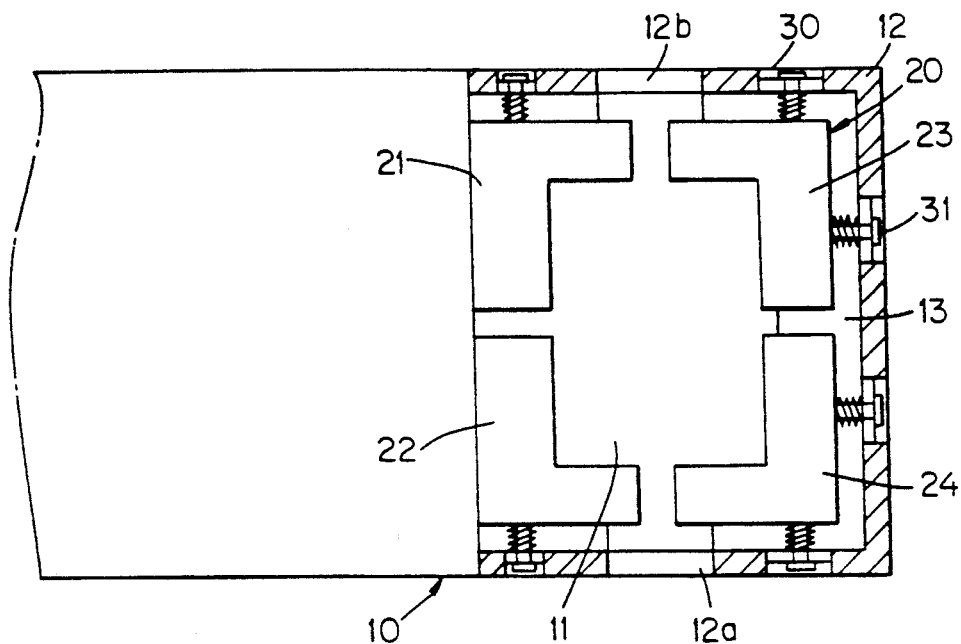
FIG. 3 is a plan view of a multi heater block according to this invention.
Figure 4:
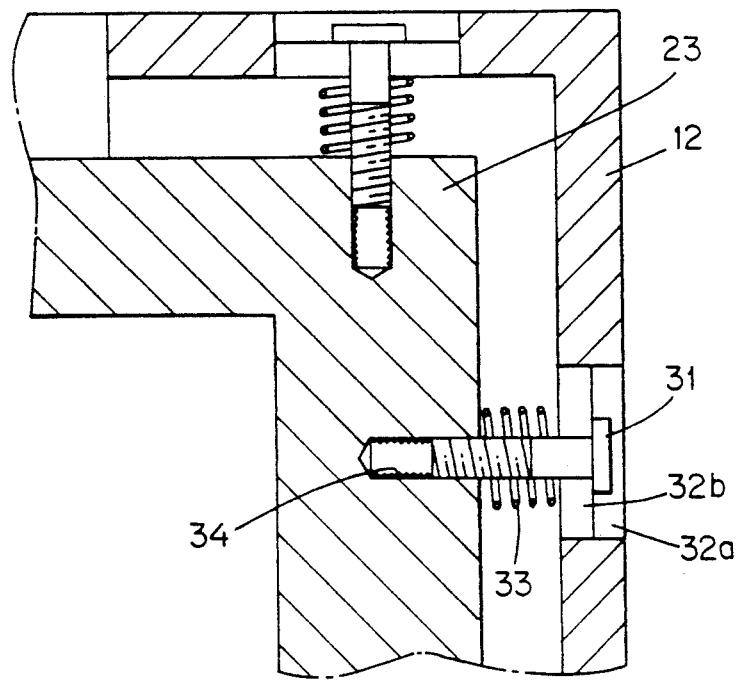
FIG. 4 is a partial sectional view of a multi heater block according to this invention.

Referring to FIGS. 2 to 5 which show a multi heater block of a wire bonder including a paddle support 11 formed on the upper surface of a heater block body 10 at a relatively lower height than that of the upper surface thereof, a guide groove 13 formed so as to have a predetermined depth and width between the paddle support 11 and a periphery wall 12 of the heater block body 10, a plurality of lead support portions 20 disposed in the four corners of the paddle support portion 11 so as to form a paddle seating portion 11a therein, a support portion 20b inserted into the guide groove 13 and a thin plate portion 20a folded at the upper surface of the paddle support portion 11 being integrally formed with each other, and a plurality of size adjusting units 30 clamped between the support portion 20b of the lead support portion 20 and the periphery wall 12 of the heater block body so as to move and fix the lead support portion 20 in every direction. Here, the paddle support portion 11 is formed in the upper surface of the heater block body 10 at a predetermined lower height than that of the upper surface thereof and the upper surface of the lead support portion 20 being overlapped thereon is formed to the same height with the surface of the heater block body 10. In other words, the thin plate portion 20a have a thickness corresponding to the height difference, for example 0.5 mm, between the lead and the pad of the lead frame.

Further, when the thickness of the heater block body 10 is about 2 cm, the support portion 20b of the lead support portion 20 is provided with the screw groove having a depth, about 1 cm, by forming the guide groove 13 and having a space for allowing the support portion 20b to be movable in every direction by overlapping the thin plate portion 20a with the upper surface of the paddle support portion 11. That is, the width of the support 20b of the lead support 20 is provided such that the support 20b is allowed to be movable in every direction in the guide groove 13.

Here, the size adjusting unit 30 comprises a long hole portion 32 formed in a predetermined part of the periphery wall 12, having a large diameter portion 32a and a small diameter portion 32b, a screw groove 34 formed in the support portion 20b of the lead support portion 20, an adjusting screw 31 coupled to the screw groove 34 with the end thereof to be movable in every direction in the long hole portion 32 by hooking the head portion thereof in the small diameter portion 32b of long hole portion 32, a support member for supporting the lead support portion 20 against the periphery wall 12 by being outwardly inserted in the adjusting screw 31.

As for the support member, a compression spring or a plurality of snap rings may be used.

Moreover, the length of the screw groove 34 is formed at a relatively larger than that of the screw portion of the adjusting screw 31 inserted thereinto so that the adjusting screw 31 is pushed by the compression spring in being pulled or disjointed the lead support portion 20 by means of the adjusting screw 31.

Also, paddle support seating grooves 12a, 12b are formed in the periphery wall 12 to be seated the paddle support in the center of a front and rear portions thereof.

The lead support portion 20 includes two lead support portions 21, 22 forward and backward movably disposed by one size adjusting means, two lead support portions 23, 24 movably disposed in every directions by two size adjusting means, respectively, disposed in the sideward and forward or backward.

In this case, the size adjusting means for fixing two lead support portions 21, 22 by forwardly and backwardly moving may be replaced with a screw inserting hole having a large diameter portion and a small diameter portion.

Further, one of four separated lead support portions 20 may be fixed, the other thereof may be moved forwardly and backwardly, and the remaining two may be moved in every direction.

Moreover, four lead support portion may be divided by two so as to be eight lead support portions.

The operation of the multi heater block of a wire bonder according to the present invention is as follows:

First, a multi heater block having a plurality of lead support portion 20 movable in every direction is mounted in a wire bonder and the user adjusts the size of paddle seating portion 11a by jointing or disjointing the adjusting screw 31 of the size adjusting means 30 so that the size of paddle seating portion 11a is consisted with the paddle size of the lead frame and then the preheating of the lead frame and the bonding of the wire are performed.

In adjusting the size of the paddle seating portion 11a, the adjusting screw 31 of the adjusting member 30 is disjointed by the user according to the paddle size, to move the lead support portion 20 so that the size of the paddle seating portion 11a is adjusted to the desired size and then the adjusting screws 31 are fastened to fix the lead support portions 20.

At this time, as each support portion 20b of the lead support portion 20 is movably disposed forwardly or backwardly in the guide groove 13, and the lead support portion 23, 24 being movable in every direction is formed in the long hole portion 32 of the size adjusting unit 30, the position of the adjusting screw 31 can be changed in every direction in the long hole portion 32.

For example, when the paddle size is increased in length and width, first, each adjusting screw of the lead support portions 23, 23 being forwardly or backwardly movable are fastened, while each adjusting screw of the lead support portions 23, 24 being movable in every direction are loosened until each compression spring is compressed by the adjusting screw thereof, the lead support portions 23, 24 are jointed at desired position by each adjusting screw and fixed in place so that the paddle seating portion 11a can be adjusted to the desired size.

Figure 5:
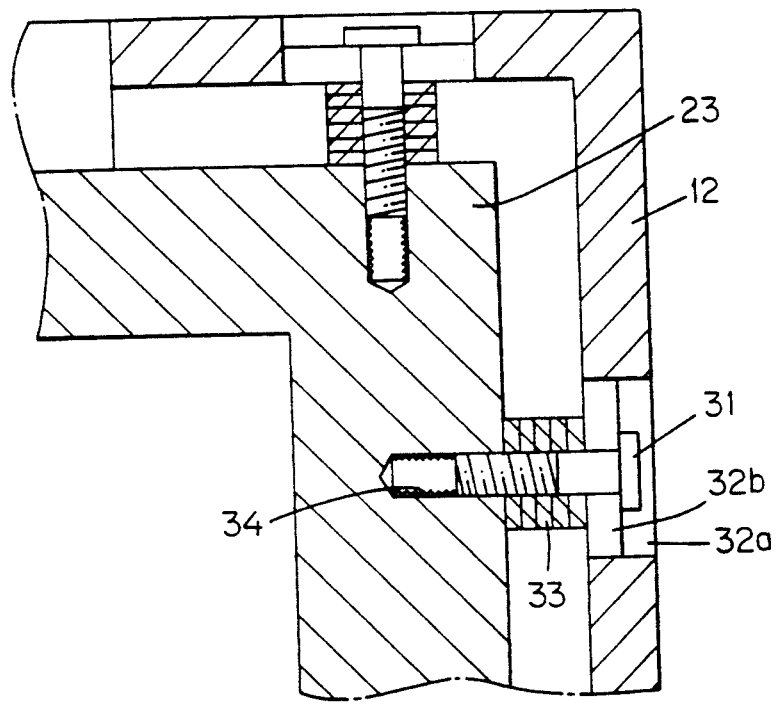
FIG. 5 is a partial sectional view showing a using example of snap rings in the multi heater block according to this invention.

On the other hand, as shown in FIG. 5, when the snap rings instead of compression spring are used, first, the adjusting screw is loosened not to be completely separated and the snap rings are added or extracted so as to be consisted with the changed size of the paddle seating portion 11a, and then each adjusting screw is tightly jointed so that the lead frame 20 is fixed. Thereby the lead support 20 is spaced apart from the periphery wall 12 as much as the number of the snap ring of each direction whereby adjusting the size of the paddle seating portion 11a.

Using the compression spring as described above, the size may be exactly controlled. However, as the lead support portion 20 is resiliently supported by the pressure of the compression spring, the use of the compression spring has a disadvantage in that it is difficult to fasten the adjusting screw at the desired position moved. Accordingly, the position of the lead support portion 20 is easily fixed by way of the fixing means. Then, in case of using the snap ring as described above, the size of the paddle seating portion 11a is exactly and easily adjusted than that of the compression spring, while the exact control adjusted by the number of the snap ring is difficult.

Accordingly, when the paddle size is changed due to the kind of the lead frame, the position of the lead support portion 20 is adjusted by jointing or disjointing each adjusting screw 31 without disjointing the heater block and replacing it with new block so that the paddle seating 11a can be consisted with the paddle size to be preheated.

As described above, the present invention provides the effects that four separated or eight separated lead support portions are formed in the upper surface of a multi heater block body, respectively, and each lead support portion is disposed to be moved in every direction by the adjusting screw so that the size of the paddle seating portion can be adjusted in consistence with changed paddle size by moving the lead support portion without exchanging the heater block due to the change of the paddle size. Therefore, in case of preheating a lead frame having a different paddle size, the size of the paddle seating portion is adjusted by changing in every direction the position of the lead support portion to correspond to the paddle size of the lead frame so that it is not necessary to exchange the heater block. The size of paddle seating portion is adjusted so that lead frames of various kinds having a different paddle size can be preheated by one heater block whereby the down time according to the exchange of the heater block and the expence according to the manufacture of several heater blocks having a different size of the paddle seating grooves are reduced so that the quality of the package and the productivity are improved.

Although the perferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi heater block of a wire bonder, comprising:
   a multi heater block of a wire bonder including a paddle support formed on the upper surface of a heater block body at a relatively lower height than that of the upper surface thereof:
   a guide groove formed so as to have a predetermined depth and width between the paddle support and a periphery wall of the heater block body;
   a plurality of lead support portions disposed in four corners of the paddle support portion so as to form a paddle seating portion therein, a support portion inserted into the guide groove and a thin plate portion folded at the upper surface of the paddle support portion being integrally formed with each other; and
   a plurality of size adjusting means clamped between the support portion of the lead support portion and the periphery wall of the heater block body so as to move and fix the lead support portion in front/rear and left/right directions.

2. A multi heater block of a wire bonder according to claim 1, wherein said periphery wall is provided with the paddle support seating grooves in the center of a front and rear portions thereof.

3. A multi heater block of a wire bonder according to claim 1, wherein said size adjusting means includes a long hole portion formed in a predetermined part of the periphery wall, having a large diameter portion and a small diameter portion, a screw groove formed in the support portion of the lead support portion, an adjusting screw screwed to the screw groove with the end thereof to be movable in every direction in the long hole portion by hooking the head portion thereof in the small diameter portion of the long hole portion, and a support member for supporting the lead support portion against the periphery wall by being outwardly inserted in the adjusting screw.

4. A multi heater block of a wire bonder according to claim 3, wherein
said support means is a compression spring or a plurality of snap rings.

5. A multi heater block of a wire bonder according to claim 3, wherein said length of the screw groove is formed at a relatively longer length than that of the screw portion of the adjusting screw inserted thereinto so that the lead support portion is drawn or pushed in disjointing by means of the adjusting screw.

6. A multi heater block of a wire bonder according to claim 1, wherein said lead support portion includes two lead support portions forward and backward movably disposed by one size adjusting means, two lead support portions movably disposed in every direction by two size adjusting means, respectively, disposed in the sideward and forward or backward.

7. A multi heater block of a wire bonder according to claim 6, wherein said size adjusting means for fixing two lead support portions includes a screw hole having a large-diameter portion and a small-diameter portion, a screw groove formed at the support portion of the lead support portion, an adjusting screw coupled to the screw groove with an end thereof to be movable in every direction in the long hole portion by hooking the head portion thereof in the small diameter portion of the long hole portion, and a support member for supporting the lead support portion against the periphery wall by being outwardly inserted in the adjusting screw.

8. A multi heater block of a wire bonder according to claim 6, wherein one of four separated lead support portions is fixed, the other thereof moved forwardly and backwardly, and the remaining two moved in every direction.

9. A multi heater block of a wire bonder according to claim 1, wherein said lead support portion is eight lead support portions each separately formed and movable in front/rear and left/right directions.

* * * * *